United States Patent [19]

Whitaker, Jr.

[11] Patent Number: 4,846,523
[45] Date of Patent: Jul. 11, 1989

[54] WINDSHIELD ASSEMBLY AND METHOD

[75] Inventor: Harold M. Whitaker, Jr., Pleasanton, Calif.

[73] Assignee: PACCAR Inc, Bellevue, Wash.

[21] Appl. No.: 100,931

[22] Filed: Sep. 24, 1987

[51] Int. Cl.$^4$ ............................................... B60J 1/00
[52] U.S. Cl. ..................................... 296/93; 296/201; 52/208; 52/308; 52/746
[58] Field of Search .................... 296/146, 201, 93; 52/208, 400, 716, 308, 477, 746

[56] References Cited

U.S. PATENT DOCUMENTS

| | | | |
|---|---|---|---|
| 4,591,203 | 5/1986 | Furman | 296/201 |
| 4,700,525 | 10/1987 | Nieboer et al. | 52/208 |
| 4,712,341 | 12/1987 | Harris, Jr. et al. | 296/201 |
| 4,723,809 | 2/1988 | Kida et al. | 296/201 |

Primary Examiner—Robert R. Song
Attorney, Agent, or Firm—Flehr, Hohbach, Test, Albritton & Herbert

[57] ABSTRACT

A front windshield assembly especially suitable for use as part of a truck is disclosed herein. This assembly includes a window plate having a generally rectangular outer circumferential edge section and a single continuous gasket integrally molded in place around the outer circumferential edge of the window plate. The gasket is designed to include squared corners so as to present a distinctly rectangular appearance. In actual embodiment such windows and associated gaskets are joined together to provide an overall windshield assembly which is distinctly rectangular in appearance.

7 Claims, 2 Drawing Sheets

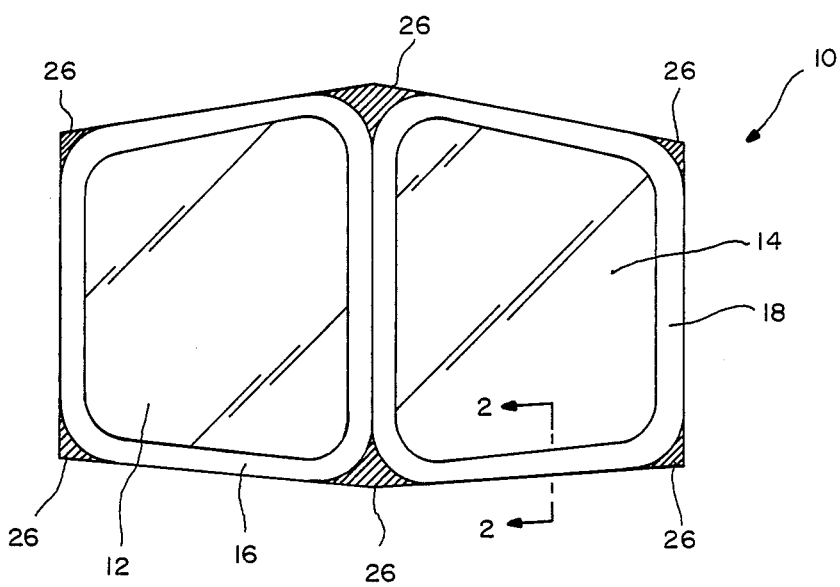
(PRIOR ART)
FIG.—1
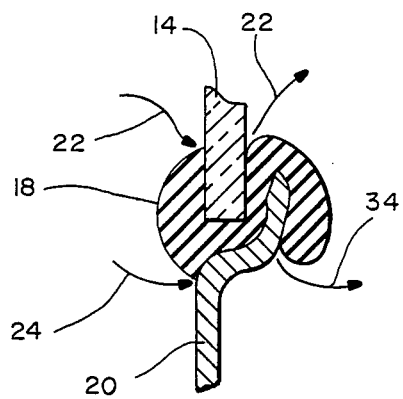
(PRIOR ART)
FIG.—2

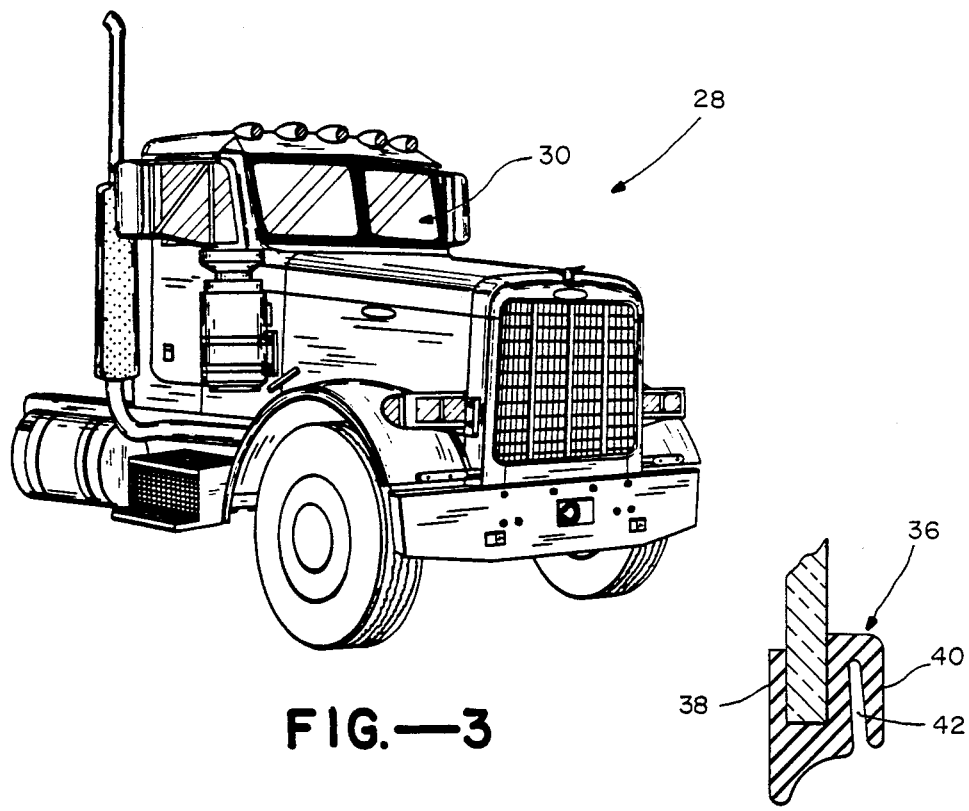
FIG.—3
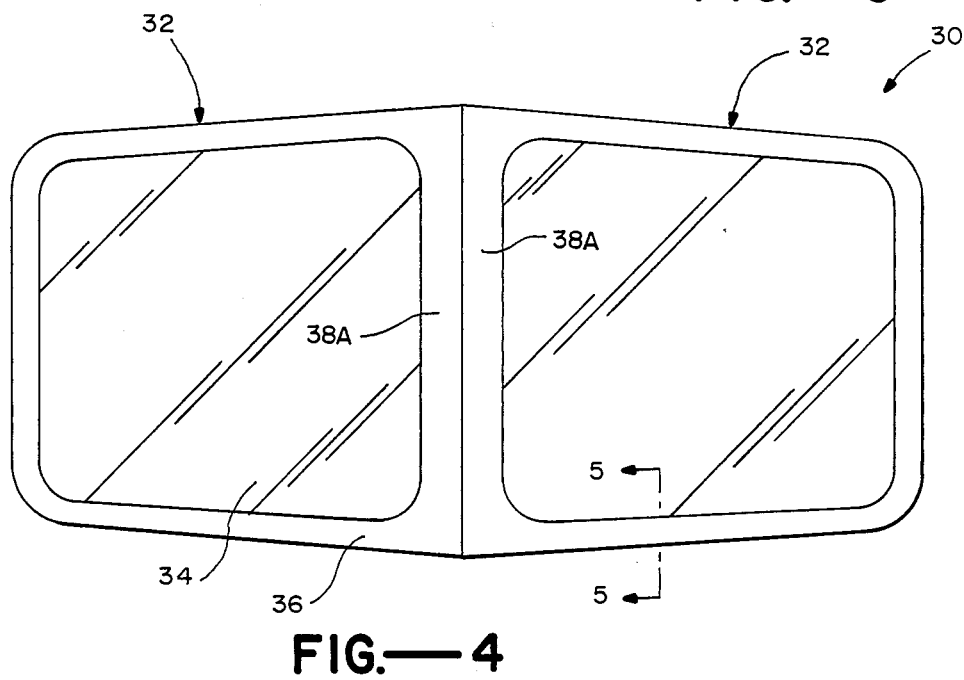
FIG.—5
FIG.—4

WINDSHIELD ASSEMBLY AND METHOD

The present invention relates generally to a windshield and cooperating framework around the windshield and more particularly to a specifically designed front windshield assembly especially suitable for use as part of a truck.

A typical prior art windshield assembly for use as a part of a truck is illustrated in FIG. 1 and generally designated by the reference numeral 10. As seen in this figure, the assembly includes two generally rectangular window plates 12 and 14 with their respective outer circumferential edges covered with sealing gaskets 16 and 18, respectively. In this typical prior art assembly, each sealing gasket is initially extruded as a continuous, flexible lengthwise section separate and apart from its window plate and thereafter bonded to the window plate in a conventional manner. A typical cross section for each gasket is illustrated in FIG. 2. Note specifically that the gasket extends over a circumferential end section of plate 14 on one side of the gasket and over a top end section of an adjacent windshield mask which also forms part of the truck. Gasket 16 joins window plate 12 to the windshield mask in the same manner.

There are two distinct drawbacks to the windshield assembly described in FIGS. 1 and 2. First, each circumferential gasket 16 and 18 assembly in place in the manner illustrated in FIG. 2 defines two potential moisture leak paths. One such path is between the gasket and the window plate, as diagrammatically represented by arrow 22. The other path is between the gasket and the windshield mask, as diagrammatically represented by the arrows 24. In this regard the left-hand side of gasket 18, as viewed in FIG. 2, represents the front of the overall windshield assembly.

The second drawback to assembly 10 resides in the fact that its sealing gaskets are first extruded apart from their window plates in lengthwise sections having uniform widths. When these gaskets are assembled to their respective window plates their corners are necessarily rounded, as illustrated in FIG. 1. Thus, in order to provide a finished, squared-off look, both inside and outside the windshield assembly, it is necessary to add separate trim pieces, especially at the joining corners of the two window plates. These trim pieces, which are shown in FIG. 1 at 26, add cost to the overall assembly, both in terms of labor and material. Moreover, they make it difficult for the overall windshield assembly to present a streamlined, finished appearance.

In view of the foregoing, it is an object of the present invention to provide a front windshield assembly especially suitable for use as part of a truck and specifically an assembly which does not include the disadvantages cited immediately above.

A more particular object of the present invention is to provide a front windshield assembly that presents a distinctly rectangular appearance without having to use trim pieces.

Another particular object of the present invention is to provide a front windshield assembly including a combination window plate/gasket design in which the prior art leakage path between the window plate and gasket is substantially eliminated.

As will be described in more detail hereinafter, the front windshield assembly disclosed herein includes a window plate and gasket, as in the prior art. However, in accordance with the present invention, the gasket is a single continuous gasket integrally molded in place around the outer circumferential edge of the window plate and it is molded to have square corners so as to present a distinctly rectangular appearance. In an actual working embodiment, two such window plates and cooperating gaskets are placed side by side so as to present an overall distinctly rectangular appearance. Note that this is accomplished without the need for separate trim pieces. Also, because each gasket is integrally molded in place around its cooperating window plate, by means of injection molding in an actual working embodiment, moisture leakage between the window plate and seal is virtually eliminated.

The windshield assembly of the present invention and the method in which it is assembled will be described in more detail below in conjunction with the drawings wherein:

FIG. 1 is a front perspective view of a prior art type of front windshield assembly especially suitable for use as part of a truck;

FIG. 2 is a sectional view of the windshield assembly of FIG. 1, taken generally along lines 2—2 in FIG. 1;

FIG. 3 is a perspective view of a truck including a front windshield designed in accordance with the present invention;

FIG. 4 is a front perspective view of the front windshield assembly illustrated in FIG. 3; and FIG. 5 is a sectional view of the front windshield assembly of FIG. 4, taken generally along lines 5—5 in FIG. 4.

Turning now to the drawings, attention is immediately directed to FIGS. 3-5, inasmuch as FIGS. 1 and 2 were discussed above. FIG. 3 illustrates a truck 28 including a front windshield assembly 30 designed in accordance with the present invention. As illustrated in FIG. 4, windshield assembly 30 is comprised of two identical or substantially identical subassemblies 32, each of which includes its own window plate 34 and associated sealing gasket 36, as will be discussed immediately below.

Still referring to FIG. 4 in conjunction with FIG. 5, each window plate forming part of windshield assembly 30 has a generally rectangular outer circumferential edge. Each sealing gasket 36 is a single continuous gasket integrally molded in place around the outer circumferential edge of its associated window plate. In an actual working embodiment, each window plate 34 is placed in an injection mold and its gasket is injection molded in place around the outer circumferential edge section of the plate. This virtually eliminates any potential leakage path between the window plate and sealing gasket. Note also from FIG. 5 the specific cross-sectional configuration of each sealing gasket 36. The gasket includes a front circumferential face 38 and a rear circumferential face 40, as well as groove 42 for receiving the windshield mask (not shown).

Each sealing gasket 36 is integrally molded as a single unit in place around its window plate, as indicated above, and it should be apparent from FIG. 4 that each sealing gasket presents a distinctly rectangular appearance. In a preferred and actual working embodiment, the width of each gasket is not uniform throughout its circumferential extent. More specifically, in the case of front face 38, the inner adjacent vertical sides indicated at 38a are wider than the outer vertical sides and the horizontally extending sides. Note also that sides 38a are positioned directly against one another and in alignment so as to present a distinctly rectangular appearance to the overall windshield assembly. While not shown, the rear side of each subassembly 32 and the overall assembly present distinctly rectangular appearances from within the truck 28.

As indicated above, in an actual working embodiment, each gasket 36 is injection molded in place around its respective window plate. As also stated, this injection molding process in which a sealing gasket is molded in place around plate glass is not per se new and hence will not be described herein. In the actual working embodiment, each gasket is formed of polyurethane, although the present invention is not limited to this particular material.

What is claimed is:

1. A front windshield assembly especially suitable for use as part of a truck, comprising:
   (a) a first window plate having a rectangular outer circumferential edge section with four angular corners, and
   (b) a first single continuous gasket having rectangular inner and outer circumferential walls, said gasket integrally molded in place around said outer circumferential edge section of said window plate, said inner and outer circumferential walls of said gasket being molded to have angular corners so as to present a distinctly rectangular appearance.

2. An assembly according to claim 1 wherein the width of said continuous gasket is not uniform throughout its circumferential extent.

3. An assembly according to claim 1 wherein said gasket is constructed of polyurethane.

4. An assembly according to claim 1 including a second window plate substantially identical to said first window plate and a second continuous gasket substantially identical to said first continuous gasket integrally molded in place around said second window plate, said first and second window plates and said first and second continuous gaskets mounted adjacent one another in corresponding rectangular windshield masks to form a unitary front windshield assembly.

5. A method of making a windshield assembly especially suitable for use as part of a truck, comprising the steps of:
   (a) providing a first window plate having a generally rectangular outer circumferential edge section with four angular corners; and
   (b) integrally molding a first single continuous gasket having generally rectangular inner and outer circumferential edge sections in place around said outer circumferential edge of said window plate, said inner and outer circumferential edge sections of said gasket having angular corners corresponding to said angular corners of said window plate so as to present a distinctly rectangular appearance.

6. A method according to claim 5 including the steps of:
   (a) providing a second window plate substantially identical to said first window plate; and
   (b) integrally molding a second single continuous gasket substantially identical to said first continuous gasket in place around an outer circumferential edge of said second window plate, and mounting said first and second continuous gaskets adjacent one another is corresponding rectangular windshield masks to form a unitary front windshield assembly.

7. A method according to claim 5 wherein said gasket is injection molded in place around said window plate.

* * * * *